United States Patent [19]

Yoo et al.

[11] Patent Number: 5,737,299
[45] Date of Patent: Apr. 7, 1998

[54] OPTICAL PICKUP APPARATUS HAVING WAVE PLATES

[75] Inventors: Jang-hoon Yoo; Chul-woo Lee, both of Seoul, Rep. of Korea

[73] Assignee: Samsung Electronics Co., Ltd., Suwon, Rep. of Korea

[21] Appl. No.: 733,970

[22] Filed: Oct. 18, 1996

[51] Int. Cl.$^6$ .................................................. G11B 7/00
[52] U.S. Cl. .................. 369/112; 369/44.23; 369/118; 369/110
[58] Field of Search .................... 369/112, 117, 369/118, 44.23, 110

[56] References Cited

U.S. PATENT DOCUMENTS

| | | | |
|---|---|---|---|
| 5,281,797 | 1/1994 | Tatsuno et al. | 369/118 |
| 5,337,302 | 8/1994 | Gotch et al. | 369/112 |
| 5,615,050 | 3/1997 | Kant | 369/112 |

FOREIGN PATENT DOCUMENTS 6-96463  4/1994  Japan .

Primary Examiner—David C. Nelms
Assistant Examiner—Kim-Kwok Chu
Attorney, Agent, or Firm—Burns, Doane, Swecker & Mathis, L.L.P.

[57] ABSTRACT

An optical pickup apparatus which can reduce effective size of an optical spot focused on an optical recording medium is provided. The optical pickup apparatus, in which a light beam emitted from a light source is focused on an optical medium for recording a signal on the optical medium and reproducing the signal from the optical medium, includes an objective lens for focusing the light beam on the surface of the optical medium and focusing a beam reflected from the surface of the optical medium, and two or more wave plates each having a different optical axis direction and located on an optical path between the light source and the objective lens. As a result, the spot size and the intensity of a first side lobe can be decreased, and the spot size can be adjusted according to the recording and reproducing modes.

6 Claims, 7 Drawing Sheets

OPTICAL AXIS OF INCIDENT BEAM

OPTICAL AXIS OF INCIDENT BEAM

OPTICAL PICKUP APPARATUS HAVING WAVE PLATES

BACKGROUND OF THE INVENTION

The present invention relates to an optical pickup apparatus which can reduce effective size of an optical spot focused on an optical recording medium, and more particularly, to an optical pickup apparatus which can reduce the size of a linearly polarized spot using a plurality of wave plates each being different in the direction of optical axis.

Generally, a long-wavelength beam having a 780 nm or 830 nm wavelength has been used as a light source of optical pickup apparatuses. However, as demand for data to be recorded on an optical disk with high density, has increased a much smaller size of optical spot has been required.

The diameter of an optical spot decreases as the wavelength of the light source is shortened. Also, the diameter of the optical spot increases as a numerical aperture of an objective lens increases. The portion of the light beam passing through the center of the objective lens has been blocked for increasing resolution of the reproduced signal. However, the intensity of radiation is considerably lowered and a servo signal becomes weak in this type of system.

FIG. 1 is a schematic diagram of a conventional optical pickup apparatus. Referring to FIG. 1, the structure and function, and problems of the conventional optical pickup apparatus will be described.

The optical pickup apparatus includes a light source 1 for generating an incident beam of about a 530 nm (short) Wavelength in order to reduce the size of optical spot focused on an optical disk 7 which is an optical recording and reproducing medium, an objective lens 6 for focusing beam emitted from the light source on the optical disk 7, a photo-diode 9 for detecting recorded information and generating an error signal by receiving beam transmitted through the objective lens 6 after being reflected from the optical disk 7, a collimating lens 4 for collimating beam generated from the light source 1, a polarization beam splitter 2 for differentiating a path of the beam reflected from the optical disk 7 from that of the beam incident thereto, a grating 3 for diffracting a beam in order to detect a tracking error signal, and an astigmatic lens 8 placed on the optical path between the polarization beam splitter 2 and the photo-diode 9 for detecting a focus error signal.

Also, a diaphragm 5 is placed between the collimating lens 4 and the objective lens 6 and finely adjusts the diameter of the optical spot formed on the optical disk 7 after being converged by the objective lens 6, according to the recording density of the optical disk 7. The focusing error signal and tracking error signal detected by the photo-diode 9 is transmitted to a servo (not shown), so that the distance between the objective lens 6 and the optical disk 7 is adjusted and deviation of optical spot from the track is compensated.

The above conventional optical pickup apparatus can detect a signal by relatively constant intensity of radiation by adjusting the spot size according to the recording density of the optical disk 7 and compensating loss of the intensity of radiation caused by the diaphragm 5. However, there are disadvantages in that the optical spot size should be adjusted by the diaphragm 5 and a device (not shown) for driving the diaphragm 5 is required. Also, since the intensity of radiation reaching the optical disk 7 is decreased by the diaphragm 5, driving range of the light source 1 (intensity) should be widened. Also, the first side lobe in the spot has high intensity and jitter occurs by a crosstalk.

SUMMARY OF THE INVENTION

Therefore, it is an object of the present invention to provide an optical pickup apparatus which can improve efficiency in the use of beam emitted from a light source using wave plates each being different in the direction of an optical axis.

To achieve the above object, there is provided an optical pickup apparatus in which a light beam emitted from a light source is focused on an optical medium for recording a signal on the optical medium and reproducing the signal from the optical medium, the optical pickup apparatus comprising: an objective lens for focusing the light beam on the surface of the optical medium and focusing a beam reflected from the surface of the optical medium; and at least two or more wave plates each having a different optical axis direction and located on an optical path between the light source and the objective lens.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
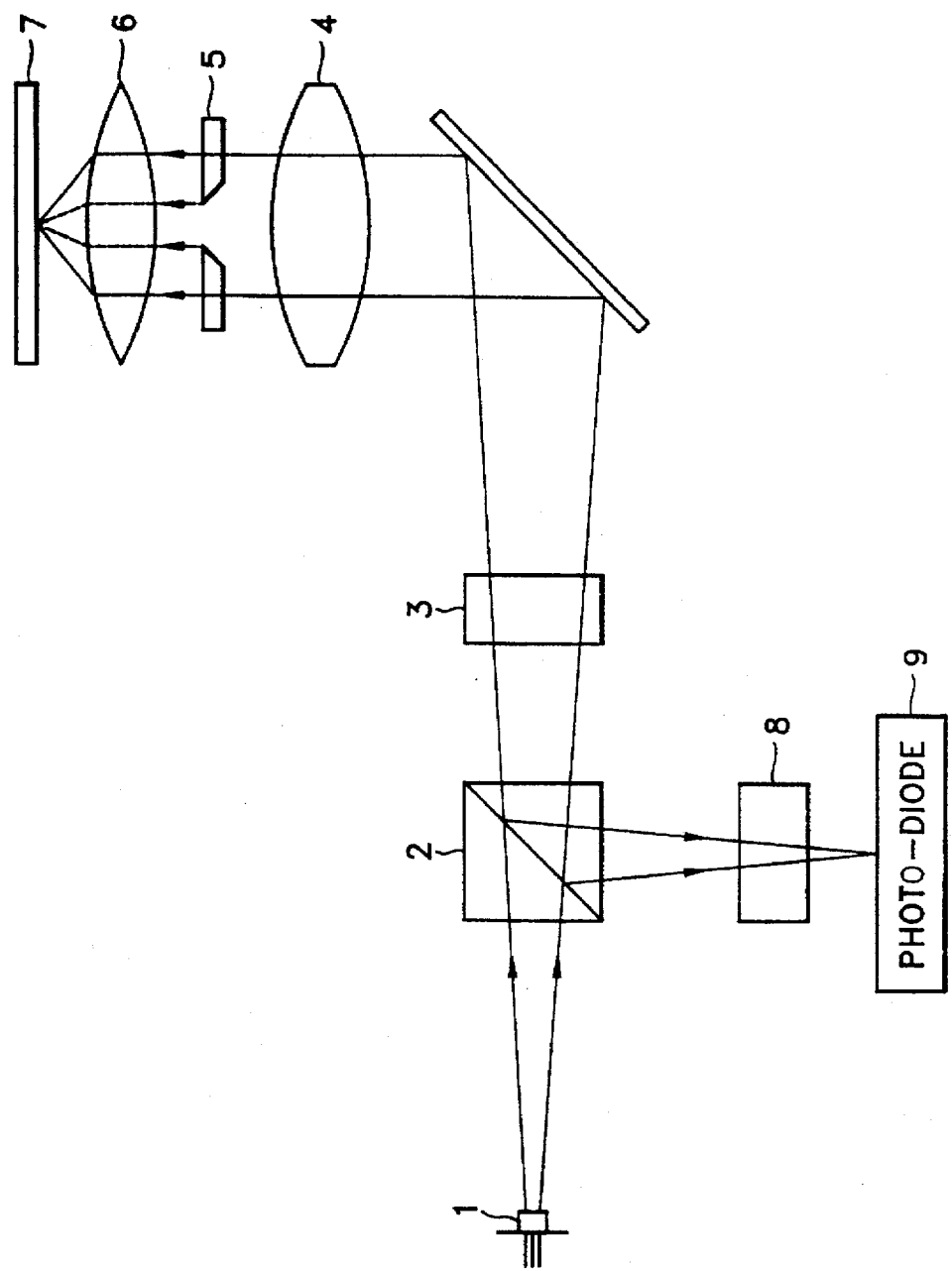
FIG. 1 is a schematic diagram of a conventional optical pickup apparatus.
Figure 2:
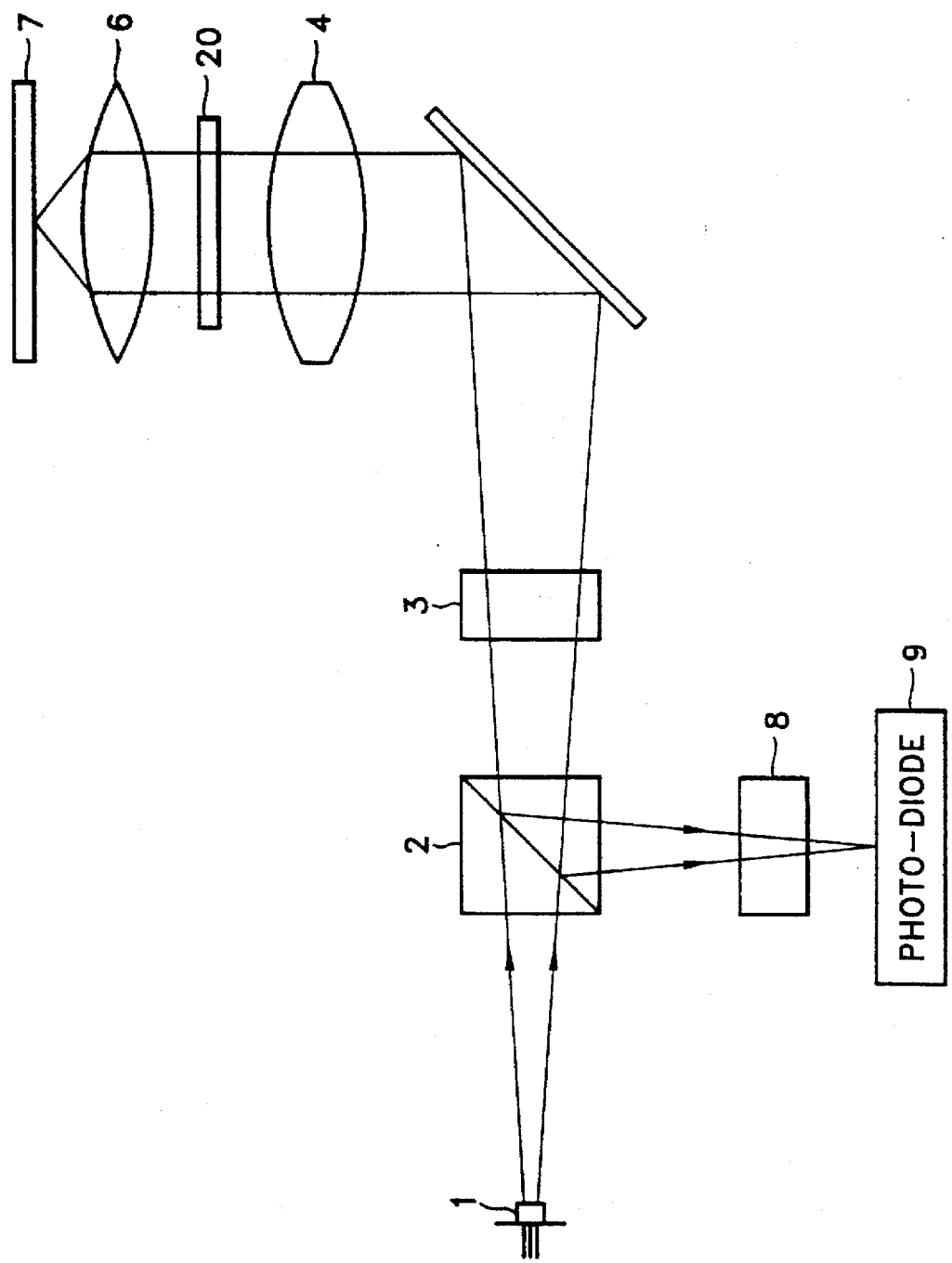
FIG. 2 is a schematic diagram of an optical pickup apparatus according to the present invention.

According to the optical pickup apparatus of the present invention shown in FIG. 2, the spot size of linearly polarized light beam can be adjusted using a plurality of wave plates each having a different optical axis direction.

The optical pickup apparatus includes a light source 1, an objective lens 6 for focusing a light beam generated from the light source 1 on an optical disk 7 of an optical recording medium, and a photo-diode 9 for detecting a reproduced signal from the beam which is reflected from the optical disk 7 and then passed through the objective lens 6. The light source 1 which emits beam of a short wavelength is used for reproducing and erasing information recorded on the optical disk 7 with high density, and for recording information on the optical disk 7.

Also, a collimating lens 4 for collimating diverging beam incident from the light source 1 and a polarization beam splitter 2 for changing an optical path of the beam reflected from the optical disk 7 toward the photo-diode 9 are provided on an optical path between the light source 1 and the objective lens 6. The beam diverged from the light source 1 penetrates the collimating lens 4 and a quarter wave plate 20 having smaller aperture than an effective aperture of the objective lens 6, and then is divided into a linearly polarized beam and an elliptically polarized beam. Here, if the quarter wave plate 20 is put in the center of the optical axis, the center of the spot formed on the optical disk 7 is composed of the linearly polarized beam and the periphery of the spot is composed of the elliptically polarized beam. Thus, the size of the effective spot which is capable of detecting a signal from the disk, that is, a linearly polarized light beam, is decreased, resulting in the increase of resolution.

Figure 3:
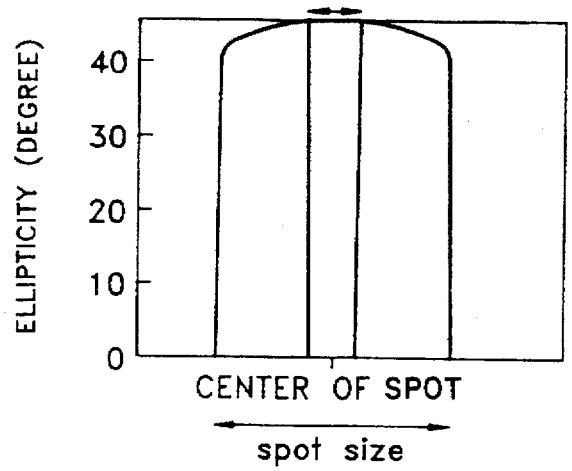
FIG. 3 is a diagram showing ellipicity of a spot in the optical pickup apparatus according to the present invention.

FIG. 3 is a diagram showing an ellipticity according to the spot size, which shows that only linearly polarized component exists in the center of the spot. In FIG. 3, 0° of ellipticity represents the linearly polarized beam, and 45° of ellipticity represents the elliptically polarized beam.

Figure 4:
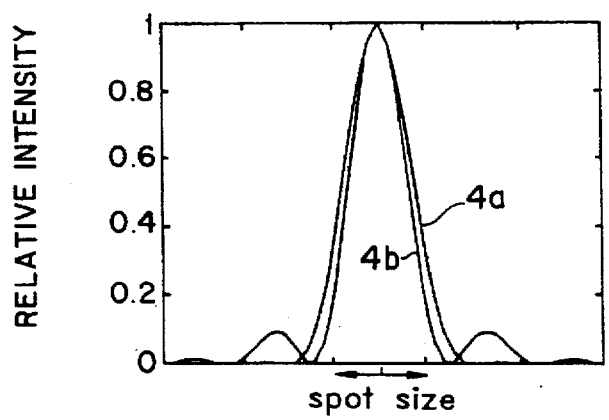
FIG. 4 is a diagram showing spot size of the conventional optical pickup apparatus and the optical pickup apparatus of the present invention.

FIG. 4 is a diagram comparatively showing the spot size 4a of the conventional optical pickup apparatus and the spot size 4b of the optical pickup apparatus of the present invention, which shows that the latter spot size 4b is smaller than the former spot size 4a.

Figure 5:
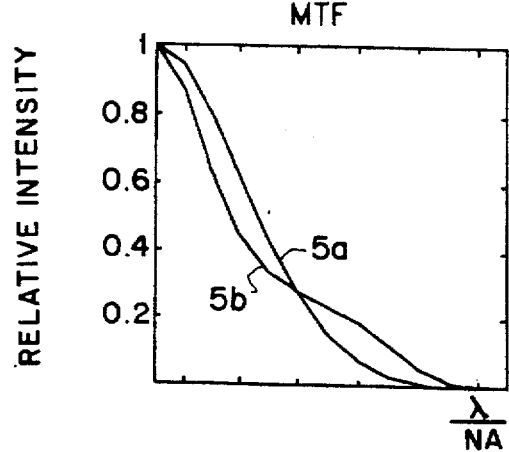
FIG. 5 is a diagram showing values of an optical modulation transfer function of the conventional optical pickup apparatus and the optical pickup apparatus of the present invention.

FIG. 5 is a diagram showing the values of an optical modulation transfer function (MTF) representing the resolution of the optical system. Here, reference numerals 5a and 5b represent those of the conventional optical pickup apparatus and the optical pickup apparatus according to the present invention, respectively. In FIG. 5, it can be determined that the MTF value 5b of the optical pickup apparatus according to the present invention is higher than the MTF value 5a of the conventional optical pickup apparatus in a high frequency region.

Figure 6A:
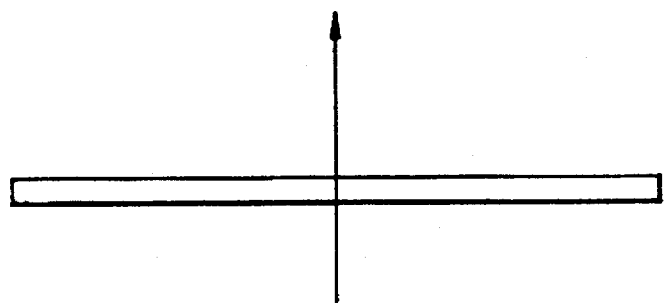
FIGS. 6A, 6B, 7A and 7B are diagrams showing embodiments of the wave plate shown in FIG. 2.
Figure 6B:
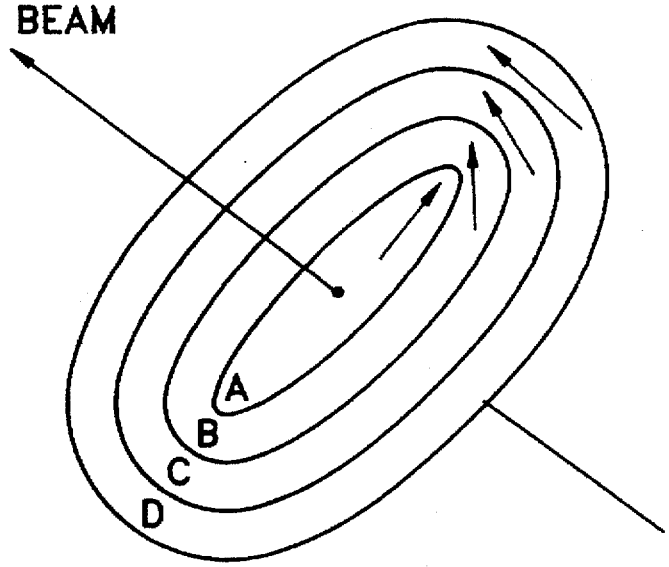
Figure 7A:
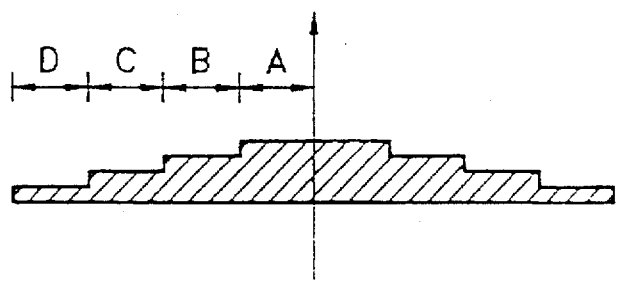
Figure 7B:
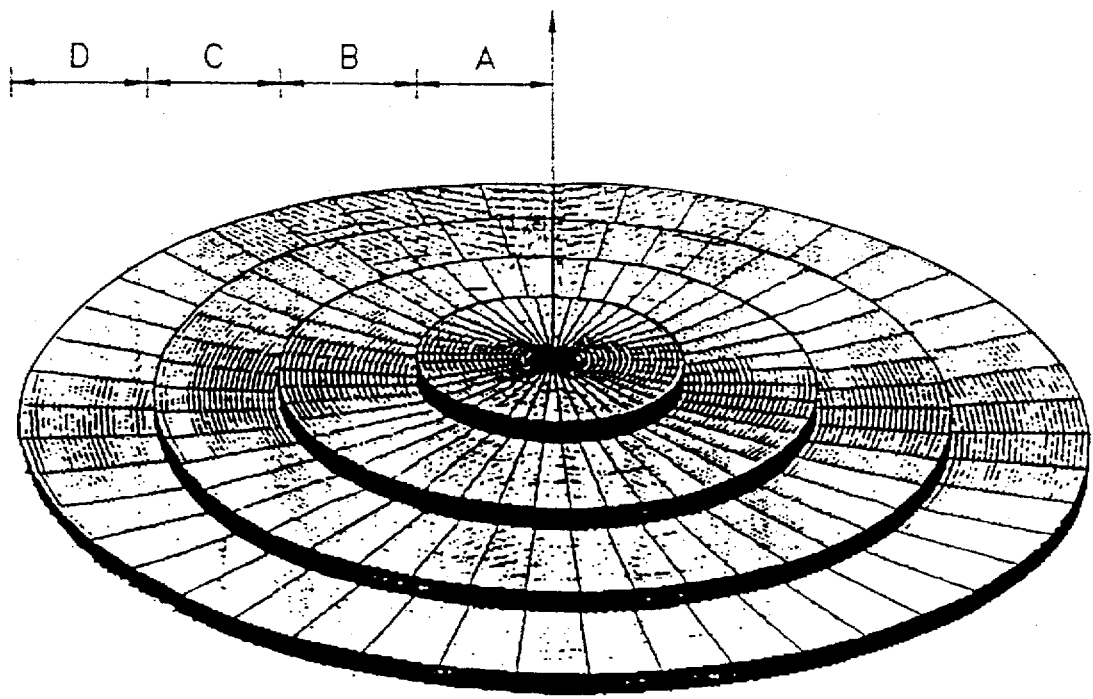

FIGS. 6A and 6B shows a preferred embodiment of the quarter wave plates each having different optical axis direction. In detail, FIG. 6A is a cross-sectional view of a plurality of ring-type quarter wave plates A, B, C and D each having different diameter, and FIG. 6B is a perspective view of the quarter wave plates shown in FIG. 6A. FIGS. 7A and 7B show another preferred embodiment of the quarter wave plates each having different optical axis direction. In detail, FIG. 7A is a cross-sectional view of the quarter wave plates A, B, C and D each separately formed of a plate and all plates forming concentric circles having the same axis, and FIG. 7B is a perspective view of the quarter wave plates A, B, C and D shown in FIG. 7A.

In FIG. 6A or FIG. 7A, for example, an optical axis of the wave plate A is installed at an angle of 45° with respect to an incident optical axis, the ¼ wave plate B 60°, that of the wave plate C 90°, and that of the wave plate D 0°, the intensity of the first side lobe of the spot focused on the optical disk 7 is decreased.

Thus, the spot size can be properly adjusted according to the recording and reproducing modes by controlling the radius of quarter wave plates each arranged in a concentric circle and the direction of optical axis thereof. Also, the spot focused on the optical disk 7 can be composed of linearly or elliptically polarized beam, and the intensity of the first side lobe having the linearly polarized component can be decreased.

Figure 8:
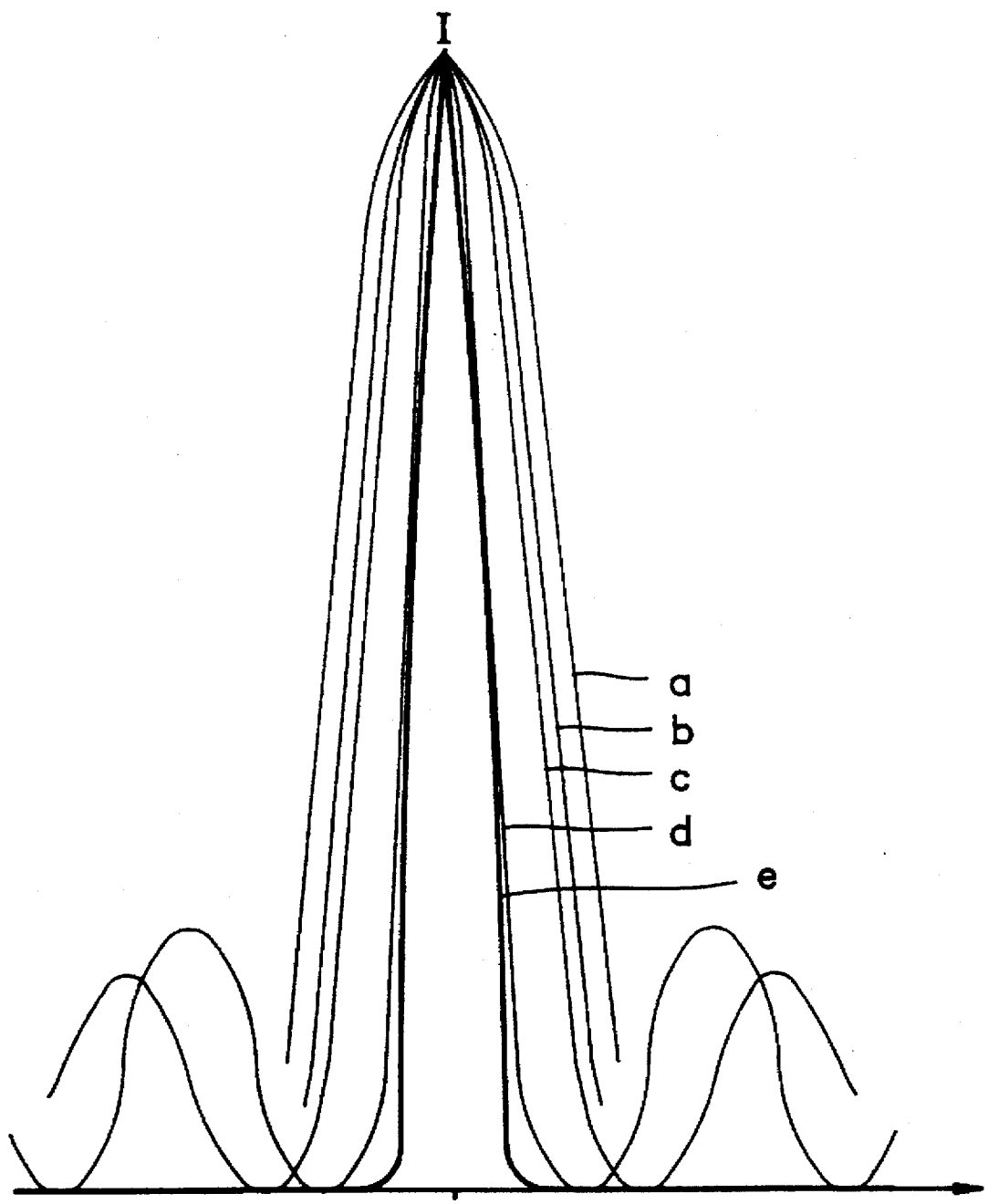
FIG. 8 is a diagram showing the spot size and distribution of beam intensity in the optical pickup apparatus of the present invention.

FIG. 8 is a diagram showing the spot size and distribution of beam intensity. Here, reference characters a, b, c and d represent the spot size and beam intensity by the quarter wave plates A, B, C and D, respectively, and reference character e represents the spot size and beam intensity which are synthetically obtained by the quarter wave plates A, B, C and D. As shown in FIG. 8, the spot size and the intensity of the first side lobe are decreased by the quarter wave plates of the optical pickup apparatus according to the present invention.

Figure 9B:
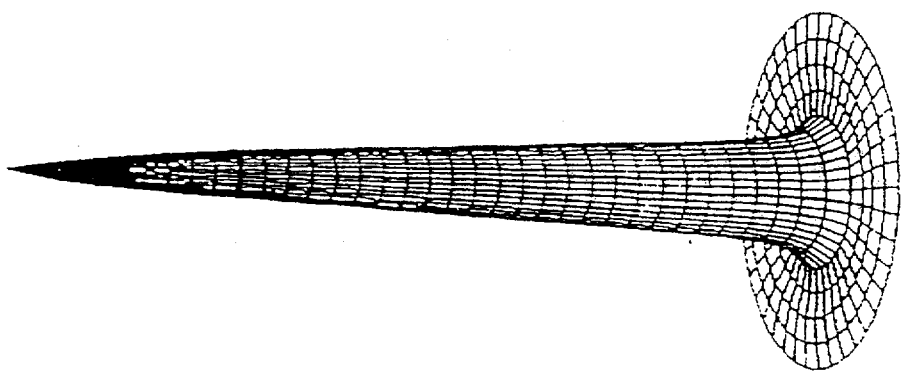
FIGS. 9A and 9B are diagrams showing the spot size and distribution of beam intensity in the optical pickup apparatuses having two and four wave plates, respectively.
Figure 9A:
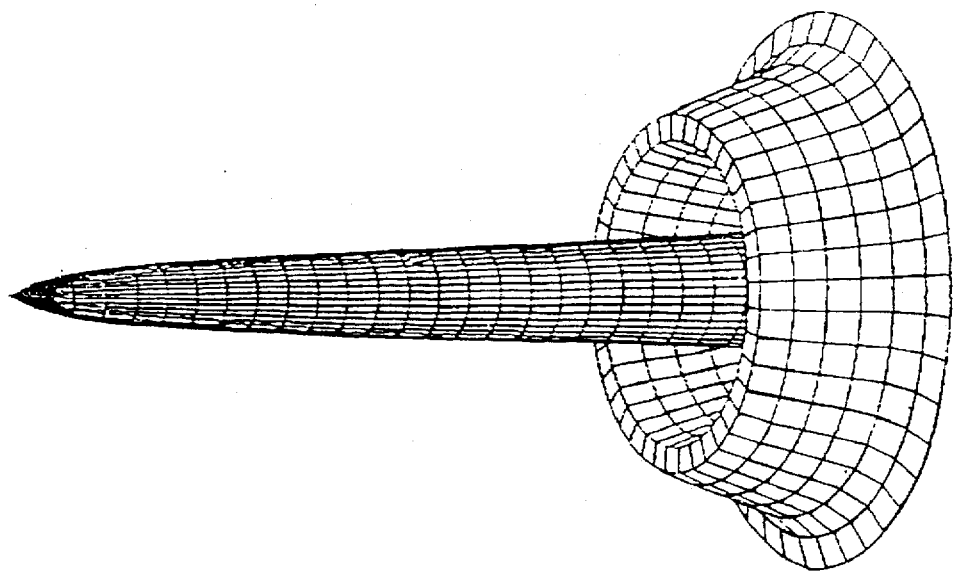

FIGS. 9A and 9B are diagrams showing the spot size and distribution of beam intensity in the optical pickup apparatuses having two and four wave plates each having a different optical axis direction, respectively. Comparing FIG. 9B with FIG. 9A, it can be understood that the spot size is relatively decreased but the intensity of the first side lobe is much decreased to a negligible level. Thus, the number and size of the quarter wave plates, and the direction of optical axis of each quarter wave plate can properly be controlled according to the recording and reproducing modes, so that the spot size is controlled to be large for recording data in the optical disk while that is controlled to be small for reproducing data from the optical disk.

As described above, the optical pickup apparatus of the present invention adopts a plurality of quarter wave plates, each having a different optical axis direction, between the light source and the disk so as to adjust the spot size. As a result, the spot size and the intensity of the first side lobe can be decreased, and the spot size can properly be controlled.

The present invention has been described by way of exemplary embodiments to which the invention is not limited. Modifications and variations will occur to skilled artisans which are within the scope of the invention defined in the claims appended hereto.

What is claimed is:

1. An optical pickup apparatus in which a light beam emitted from a light source is focused on an optical medium for reproducing the signal from said optical medium, said optical pickup apparatus comprising:

an objective lens for focusing the light beam on the surface of said optical medium and focusing a beam reflected from the surface of said optical medium; and at least two wave plates each having a different optical axis direction relative to one another and located on an optical path between said light source and said objective lens.

2. An optical pickup apparatus as claimed in claim 1, wherein said at least two wave plates are formed on a plate which is divided by a plurality of concentric circles, each divided portion of the plate having a different optical axis direction relative to one another.

3. An optical pickup apparatus as claimed in claim 2, wherein an optical axis direction of the center portion of the plate matches the optical axis direction of the light beam emitted from said light source.

4. An optical pickup apparatus as claimed in claim 1, wherein said at least two wave plates are formed by stacking a plurality of plates each having different radius with the same central axis, each wave plate having a different optical axis direction relative to one another.

5. An optical pickup apparatus as claimed in claim 4, wherein the optical axis direction of each wave plate having the least radius matches the optical axis direction of the light beam.

6. An optical pickup apparatus as claimed in claim 1, wherein said wave plates have four different optical axes of which directions are at angles of 0°, 45°, 60° and 90° with respect to the optical axis direction of the light beam.

* * * * *